US008924065B2

(12) United States Patent
Nakanishi et al.

(10) Patent No.: US 8,924,065 B2
(45) Date of Patent: Dec. 30, 2014

(54) HYBRID VEHICLE CONTROL APPARATUS

(75) Inventors: Naoki Nakanishi, Susono (JP); Susumu Kojima, Susono (JP); Yukihiko Ideshio, Nisshin (JP); Yasuyuki Kato, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 14/354,342

(22) PCT Filed: Oct. 27, 2011

(86) PCT No.: PCT/JP2011/074782
§ 371 (c)(1),
(2), (4) Date: Apr. 25, 2014

(87) PCT Pub. No.: WO2013/061437
PCT Pub. Date: May 2, 2013

(65) Prior Publication Data
US 2014/0303823 A1    Oct. 9, 2014

(51) Int. Cl.
*B60K 6/00*    (2006.01)
*B60W 20/00*    (2006.01)
(Continued)

(52) U.S. Cl.
CPC ........... *B60W 20/108* (2013.01); *B60W 10/06* (2013.01); *B60W 10/08* (2013.01);
(Continued)

(58) Field of Classification Search
CPC ..... B60W 10/02; B60W 10/06; B60W 10/08; B60W 10/26; B60W 10/115; B60W 20/00; B60W 30/186; B60W 2510/107; B60W 2510/0291; B60W 2510/0685; B60W 2710/105; Y02T 10/6221; Y02T 10/6286; Y02T 10/7077; B60L 2240/485; B60L 2240/486; B60L 2240/507; B60K 6/48
USPC .......... 701/22, 67, 101, 110; 180/65.1, 65.21, 180/65.225, 65.265, 65.275, 65.28, 65.285; 903/902, 905, 906, 912, 946; 477/3, 5, 477/6, 8
See application file for complete search history.

(56) References Cited

U.S. PATENT DOCUMENTS 7,686,112 B2 *  3/2010  Shiiba .................... 180/65.275
8,042,632 B2 * 10/2011  Wisniewski ............ 180/65.265
(Continued)

FOREIGN PATENT DOCUMENTS

JP    2000-064874 A    2/2000
JP    2006-306209 A    11/2006
(Continued)

*Primary Examiner* — Thomas G Black
*Assistant Examiner* — Ce Li
(74) *Attorney, Agent, or Firm* — Kenyon & Kenyon LLP (57) ABSTRACT

The hybrid vehicle has a motor generator disposed in a power transmission path and performing as an electric motor and an electric generator, a direct injection engine configured to execute an ignition start in which fuel is injected into any cylinder with a piston stopped in an expansion stroke and ignited for the start, and an engine connecting/disconnecting clutch of friction engagement type directly connecting and interrupting the direct injection engine to/from the motor generator. The control device of the hybrid vehicle has an MG creep mode in which the motor generator is used as an electric motor and rotationally driven at a predetermined first rotation speed to generate a creep torque while the engine connecting/disconnecting clutch is interrupted and the direct injection engine is stopped, and a charging creep mode in which the direct injection engine is operated at a predetermined second rotation speed higher than the first rotation speed to generate the creep torque with the motor generator used as an electric generator to charge a battery while the engine connecting/disconnecting clutch is connected, the control device performs the ignition start of the direct injection engine during the MG creep mode and provides connection control of the engine connecting/disconnecting clutch after a rotation speed of the direct injection engine exceeds a rotation speed of the motor generator to raise the rotation speed of the motor generator and directly connect the direct injection engine to the motor generator when a transition is made from the MG creep mode to the charging creep mode.

3 Claims, 6 Drawing Sheets

(51) Int. Cl.
  *B60W 10/06* (2006.01)
  *B60W 10/08* (2006.01)
  *B60W 10/02* (2006.01)
  *B60W 30/18* (2012.01)

(52) U.S. Cl.
  CPC ...... *B60W 10/026* (2013.01); *B60W 30/18063* (2013.01); *Y10S 903/93* (2013.01); *Y10S 903/906* (2013.01)
  USPC .................. 701/22; 180/65.265; 180/65.285; 903/906; 477/6; 903/930

(56) References Cited

U.S. PATENT DOCUMENTS

| | | | |
|---|---|---|---|
| 8,366,584 B2 * | 2/2013 | Stefani et al. | 477/5 |
| 8,475,330 B2 * | 7/2013 | Kaltenbach et al. | 477/5 |
| 8,475,331 B2 * | 7/2013 | Kaltenbach et al. | 477/5 |
| 8,480,536 B2 * | 7/2013 | Weiss et al. | 477/5 |
| 8,512,201 B2 * | 8/2013 | Shimanaka | 477/5 |
| 8,755,959 B2 * | 6/2014 | Fassnacht | 701/22 |
| 2006/0137920 A1 * | 6/2006 | Aoki et al. | 180/65.2 |
| 2007/0272456 A1 * | 11/2007 | Shiiba | 180/65.2 |
| 2009/0093336 A1 * | 4/2009 | Soliman et al. | 477/5 |
| 2009/0105038 A1 * | 4/2009 | Weiss et al. | 477/5 |
| 2010/0089673 A1 * | 4/2010 | Wisniewski | 180/65.285 |
| 2011/0039655 A1 * | 2/2011 | Kaltenbach et al. | 477/5 |
| 2011/0045947 A1 * | 2/2011 | Kaltenbach et al. | 477/5 |

FOREIGN PATENT DOCUMENTS

| | | |
|---|---|---|
| JP | 2008-007094 A | 1/2008 |
| JP | 2009-527411 A | 7/2009 |

\* cited by examiner

| CREEP MODE | ENGINE | MG | K0 CLUTCH | BATTERY |
|---|---|---|---|---|
| MG CREEP | STOP | POWER RUNNING | INTERRUPT | DISCHARGE |
| CHARGING CREEP | OPERATE | REGENERATION | CONNECT | CHARGE |

HYBRID VEHICLE CONTROL APPARATUS

CROSS-REFERENCE TO RELATED APPLICATIONS

This is a national phase application based on the PCT International Patent Application No. PCT/JP2011/074782 filed on Oct. 27, 2011, the entire contents of which are incorporated herein by reference.

TECHNICAL FIELD

The present invention relates to a control device of a hybrid vehicle and particularly to an MG creep mode generating a creep torque by a motor generator, a charging creep mode generating a creep torque by a direct injection engine while charging a battery, and switching control of these creep modes.

BACKGROUND ART

A hybrid vehicle is known that has (a) a motor generator disposed in a power transmission path and usable as an electric motor and an electric generator, (b) a direct injection engine capable of ignition start in which fuel is injected into any cylinder and ignited for the start, (c) a friction engagement type engine connecting/disconnecting clutch directly connecting and interrupting the direct injection engine to/from the motor generator. A hybrid vehicle described in Patent Document 1 is an example thereof and, when switching is performed from a motor running mode using only an electric drive portion (corresponding to a motor generator) as a drive force source for running while the engine connecting/disconnecting clutch is interrupted with the direct injection engine stopped to an engine running mode using the direct injection engine as the drive source for running, the direct injection engine is started by the ignition start and, when an engine rotation speed increases and becomes substantially the same as (synchronizes with) a rotation speed of the electric drive portion, the engine connecting/disconnecting clutch is connected to replace a motor torque with an engine torque.

Although the engine can start by itself only through the ignition start in some cases such as when friction of the direct injection engine is small, the engine connecting/disconnecting clutch can be connected at an engine start to give assistance (torque compensation) from the motor generator as needed, and an assist torque can significantly be reduced by the ignition start. As a result, a maximum torque of the motor generator can be reduced to achieve smaller size and lower fuel consumption.

PRIOR ART DOCUMENT

Patent Document

Patent Document 1: Japanese Unexamined Patent Application Publication (Translation of PCT Application) No. 2009-527411

SUMMARY OF THE INVENTION

Problem to be Solved by the Invention

It is contemplated that a hybrid vehicle having such a direct injection engine has (a) an MG creep mode in which the motor generator is used as an electric motor and rotationally driven at a predetermined rotation speed to generate a creep torque while the engine connecting/disconnecting clutch is interrupted and the direct injection engine is stopped, and (b) a charging creep mode in which the direct injection engine is operated to generate a creep torque with the motor generator used as an electric generator to charge a battery while the engine connecting/disconnecting clutch is connected. Switching to the charging creep mode is performed from the MG creep mode when an electric storage remaining amount SOC of the battery is reduced and, if it is attempted to simply connect the engine connecting/disconnecting clutch for cranking and starting the direct injection engine, a motor torque must be made higher so as to prevent the creep torque from changing, resulting in further deterioration of the electric storage remaining amount SOC and degradation of the battery. When a rotation speed of the motor generator during the MG creep mode may be set to relatively low rotation (e.g., about 300 rpm), if the engine connecting/disconnecting clutch is simply connected and the direct injection engine is operated, this may deteriorate NV (noise/vibration) performance and charge efficiency and may cause an engine stall. If the rotation speed of the motor generator during the MG creep mode is made higher (e.g., to about 1000 rpm) in consideration of the NV performance and the charge efficiency, the efficiency during the creep mode deteriorates and fuel efficiency is impaired. Although the ignition start of the direct ignition engine before connecting the engine connecting/disconnecting clutch suppresses the deterioration of the electric storage remaining amount SOC and the degradation of the battery, if the rotation speed of the motor generator during the MG creep mode is different from a rotation speed of the direct injection engine during the charging creep mode, a connection timing of the engine connecting/disconnecting clutch is a problem.

The present invention was conceived in view of the situations and it is therefore an object of the present invention to ensure proper execution of an MG creep mode and a charging creep mode depending on respective conditions and enable proper transition from the MG creep mode to the charging creep mode.

Means for solving the Problem

To achieve the object, the first aspect of the invention provides a control device of a hybrid vehicle, the hybrid vehicle having (a) a motor generator disposed in a power transmission path and performing as an electric motor and an electric generator, (b) a direct injection engine configured to execute an ignition start in which fuel is injected into any cylinder with a piston stopped in an expansion stroke and ignited for the start, and (c) an engine connecting/disconnecting clutch of friction engagement type directly connecting and interrupting the direct injection engine to/from the motor generator, the control device having (d) an MG creep mode in which the motor generator is used as an electric motor and rotationally driven at a predetermined first rotation speed to generate a creep torque while the engine connecting/disconnecting clutch is interrupted and the direct injection engine is stopped, and (e) a charging creep mode in which the direct injection engine is operated at a predetermined second rotation speed higher than the first rotation speed to generate the creep torque with the motor generator used as an electric generator to charge a battery while the engine connecting/disconnecting clutch is connected, (f) the control device performing the ignition start of the direct injection engine during the MG creep mode and providing connection control of the engine connecting/disconnecting clutch after a rotation speed of the direct injection engine exceeds a rotation speed of the motor generator to raise the rotation speed of the motor generator and directly connect the direct injection engine to the motor generator when a transition is made from the MG creep mode to the charging creep mode.

Effects of the Invention

The second aspect of the invention provides the control device of a hybrid vehicle recited in the first aspect of the invention, wherein (a) a fluid transmission device is disposed between the motor generator and drive wheels and a connecting/disconnecting device of frictional engagement type is disposed between the fluid transmission device and the drive wheels to transmit a creep torque via the fluid transmission device and the connecting/disconnecting device, and wherein (b) an engagement torque of the connecting/disconnecting device is reduced depending on a predefined target creep torque before the engine connecting/disconnecting clutch is subjected to the connection control when the transition is made from the MG creep mode to the charging creep mode.

The third aspect of the invention provides the control device of a hybrid vehicle recited in the first aspect of the invention, wherein when the engine connecting/disconnecting clutch is subjected to the connection control for making the transition from the MG creep mode to the charging creep mode, an engagement torque of the engine connecting/disconnecting clutch is increased while a torque of the motor generator is reduced so as to maintain the predefined target creep torque.

In the control device of a hybrid vehicle as described above, the rotation speed (second rotation speed) of the direct injection engine during the charging creep mode is higher than the rotation speed (first rotation speed) of the motor generator during the MG creep mode and, therefore, by operating the motor generator at a relatively low rotation (for example, about 300 rpm) during the MG creep mode, the predetermined creep torque can efficiently be generated to improve fuel efficiency. During the charging creep mode, by operating the direct injection engine at a relatively high rotation (for example, about 1000 rpm), the predetermined creep torque can be generated and the battery can be charged while suppressing deterioration of the NV performance and the charge efficiency as well as an engine stall.

On the other hand, when a transition is made from the MG creep mode to the charging creep mode, since the ignition start of the direct injection engine is performed during the MG creep mode and the engine connecting/disconnecting clutch is subjected to the connection control after the rotation speed of the direct injection engine exceeds the rotation speed of the motor generator to raise the rotation speed of the motor generator and directly connect the direct injection engine to the motor generator, deterioration of the electric storage remaining amount SOC and the degradation of the battery are suppressed as compared to the cranking start and the creep mode can be switched while the variation in the creep torque is suppressed. In particular, although a surge tank pressure equivalent to an atmospheric pressure results in a larger torque at the beginning of the ignition start of the direct injection engine, the engine connecting/disconnecting clutch is connected after exceeding the rotation speed of the motor generator, and the creep torque is restrained from varying due to the larger torque at the beginning of the ignition start.

The second aspect of the invention is the case that a creep torque is transmitted via the fluid transmission device and the connecting/disconnecting device, and since an engagement torque of the connecting/disconnecting device is reduced depending on a target creep torque before the engine connecting/disconnecting clutch is subjected to the connection control when the transition is made from the MG creep mode to the charging creep mode, the creep torque is limited because the connecting/disconnecting device is slipped depending on the engagement torque, and the variation in the creep torque is suppressed when the creep mode is switched. Particularly, because the creep torque is limited by a slip of the connecting/disconnecting device, a degree of freedom becomes higher in the torque replacement control of increasing the engagement torque of the engine connecting/disconnecting clutch and reducing the torque of the motor generator, and each of the change rates etc. can independently be defined or the replacement can be completed in a relatively short time.

In the third aspect of the invention, when the engine connecting/disconnecting clutch is subjected to the connection control for making the transition from the MG creep mode to the charging creep mode, the torque replacement control is provided to increase an engagement torque of the engine connecting/disconnecting clutch while a torque of the motor generator is reduced so as to maintain the predefined target creep torque and, therefore, the variation in the creep torque is suppressed when the creep mode is switched. In this case, since the variation in the creep torque is suppressed by a slip of the connecting/disconnecting device in the second aspect of the invention, the vehicle may slide down, for example, due to a delay in response when the connecting/disconnecting device is engaged in the case of starting the vehicle on an climbing road; however, since the variation in the creep torque can be suppressed without a slip of the connecting/disconnecting device in the third aspect of the invention, the slide-down of the vehicle on a climbing road as described above is suppressed.

MODE FOR CARRYING OUT THE INVENTION

The present invention is applied to a hybrid vehicle of a parallel type, a series type, etc., having a direct injection engine directly connected and interrupted by an engine connecting/disconnecting clutch to/from a motor generator disposed in a power transmission path. The direct injection engine is an engine capable of directly injecting fuel into a cylinder, is preferably a four-cycle gasoline engine, and can be direct injection engines having various numbers of cylinders including a multiple cylinder engine having four or more cylinders. The direct injection engine can be other reciprocating internal combustion engines capable of injecting fuel into a cylinder in an expansion stroke for the ignition start, such as a two-cycle gasoline engine. The engine connecting/disconnecting clutch is preferably a hydraulic friction engagement clutch of a single-plate type, a multi-plate type, etc.

The ignition start of the direct injection engine is performed, when at least any cylinder is in the expansion stroke, by injecting and igniting fuel in the cylinder in the expansion stroke, and the direct injection engine may be started by only the ignition start or the engine connecting/disconnecting clutch may be put into slip engagement such that rotation of the direct injection engine is assisted (cranked) by the motor generator. When the rotation is assisted by the motor generator, a torque of the motor generator is desirably increased by the assist torque so as to prevent the creep torque of the MG creep mode from varying.

The MG creep mode and the charging creep mode are performed during stop of a vehicle or during low vehicle speed equal to or lower than a predetermined vehicle speed and a target creep torque may be defined as a constant torque at a level enabling a vehicle to start on a flat road or may be set by using a road surface gradient, a vehicle weight, etc., as parameters. For example, on a climbing road, the target creep torque may be set to generate a creep torque substantially balancing with or smaller than a slide-down torque of a vehicle, i.e., a creep torque at a level capable of preventing the vehicle from sliding down, or allowing the vehicle to slightly slide down, regardless of an upward slope. The target creep torques during the MG creep mode and the charging creep mode are desirably equal to each other.

In the MG creep mode, the motor generator is used as an electric motor and rotationally driven at a predetermined rotation speed to generate the creep torque while the engine connecting/disconnecting clutch is interrupted and the direct injection engine is stopped and, on the other hand, in the charging creep mode, the direct injection engine is operated to generate the creep torque with the motor generator used as an electric generator to charge a battery while the engine connecting/disconnecting clutch is connected and, in either case, a transmission device is disposed that absorbs rotation while transmitting the creep torque, by disposing a fluid transmission device such as a torque converter in a power transmission path to drive wheels or slipping a friction engagement connecting/disconnecting device etc.

The rotation speed (second rotation speed) of the direct injection engine during the charging creep mode is appropriately defined in consideration of efficiency characteristics of the engine, electric generation efficiency of the motor generator, charge efficiency of the battery, a gear ratio of the power transmission path, torque characteristics of the torque converter, etc., such that a predetermined target creep torque can efficiently be generated while the NV performance and the charge efficiency are not impaired, and is desirably within a range of about 600 rpm to 1500 rpm, for example. The rotation speed (first rotation speed) of the motor generator during the MG creep mode is also appropriately defined in consideration of the efficiency characteristics of the motor generator, the gear ratio of the power transmission path, the torque characteristics of the torque converter, etc., such that a predetermined target creep torque can efficiently be generated, and is desirably within a range of about 200 rpm to 600 rpm, for example.

If a mechanical oil pump is connected to the motor generator, while the target creep torque is generated, the mechanical oil pump can rotationally be driven to generate a predetermined oil pressure. In this case, the rotation speed of the motor generator during MG creep mode and the rotation speed of the direct injection engine during the charging creep mode are desirably defined such that a necessary oil pressure and a discharge amount can be acquired. The mechanical oil pump is not necessarily essential and the present invention is applicable to a hybrid vehicle having an electric oil pump capable of generating an oil pressure regardless of operations of the motor generator and the direct injection engine.

Although connection control of the engine connecting/disconnecting clutch during transition from the MG creep mode to the charging creep mode is defined such that an engagement torque of the engine connecting/disconnecting clutch is increased at, for example, a predefined constant change rate, the engagement torque can be increased at a predetermined change pattern, and various forms are also available. Although the connection control may be started immediately after the rotation speed of the direct injection engine exceeds the rotation speed of the motor generator, the connection control may be started after the rotation speed of the direct injection engine reaches a predetermined rotation speed higher than the rotation speed of the motor generator. For example, a rotation speed for starting the connection control of the engine connecting/disconnecting clutch can be defined based on the rotation speed of the direct injection engine during the charging creep mode and the rotation speed of the motor generator during the MG creep mode, and various forms are also available.

If the target creep torque is maintained as in the third aspect of the invention, the torque of the motor generator may be decreased in accordance with an increase in the engagement torque of the engine connecting/disconnecting clutch (a decrease in a power running torque and an increase in a regenerative torque). If the engagement torque of the connecting/disconnecting device is reduced as in the second invention, since the creep torque is limited by a slip of the connecting/disconnecting device, a degree of freedom becomes higher in the connection control of the engine connecting/disconnecting clutch and a torque reduction control of the motor generator and change rates thereof can be defined independently of each other. A change pattern of the engagement torque can be made different between the second and third aspects of the invention when the connection control of the engine connecting/disconnecting clutch is provided. The connecting/disconnecting device of the second aspect of the invention may be any device capable of connecting and interrupting power transmission and is preferably a single-plate type or multi-plate type hydraulic friction engagement clutch or brake. For example, a clutch or a brake of an automatic transmission can be used as the connecting/disconnecting device.

Since the creep mode switching control of the second aspect of the invention is desirably provided on a flat road etc. without a risk of slide-down of the vehicle while the creep mode switching control of the third aspect of the invention is particularly effective on a climbing road etc. with a risk of slide-down of the vehicle, the creep mode switching controls of the second and third aspects of the invention are desirably separately used depending on a road surface gradient. The controls may separately be used depending on a condition other than the road surface gradient. Alternatively, regardless of the condition such as the road surface gradient, the creep mode switching control of the second aspect of the invention may always be provided or the creep mode switching control of the third aspect of the invention may be provided.

EXAMPLE

An example of the present invention will now be described in detail with reference to drawings.

Figure 1:
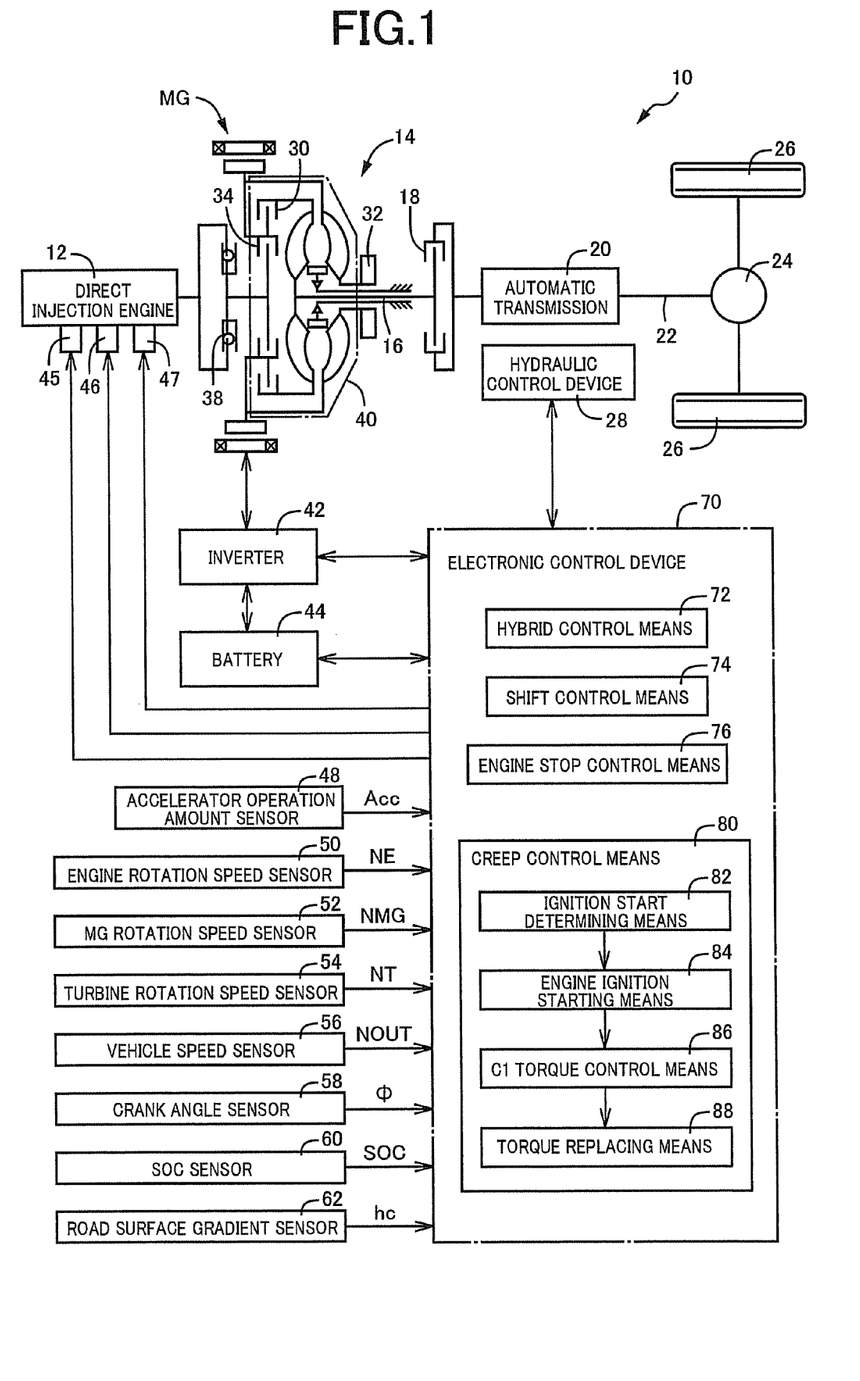
FIG. 1 is a diagram of a general configuration indicating a schematic of a hybrid vehicle to which the present invention is preferably applied along with a main portion of the control system.

FIG. 1 is a diagram of a general configuration including a schematic of a drive system of a hybrid vehicle 10 to which the present invention is preferably applied. The hybrid vehicle 10 includes a direct injection engine 12 directly injecting fuel into a cylinder and a motor generator MG acting as an electric motor and an electric generator, as a drive power source for running. An output of the direct injection engine 12 and the motor generator MG is transmitted from a torque converter 14 that is a fluid transmission device via a turbine shaft 16 and a C1 clutch 18 to an automatic transmission 20 and further transmitted via an output shaft 22 and a differential gear device 24 to left and right drive wheels 26. The torque converter 14 includes a lockup clutch (L/U clutch) 30 directly coupling a pump impeller and a turbine impeller with the pump impeller integrally connected to an oil pump 32 and the oil pump 32 is mechanically rotationally driven by the direct injection engine 12 and the motor generator MG.

Figure 2:
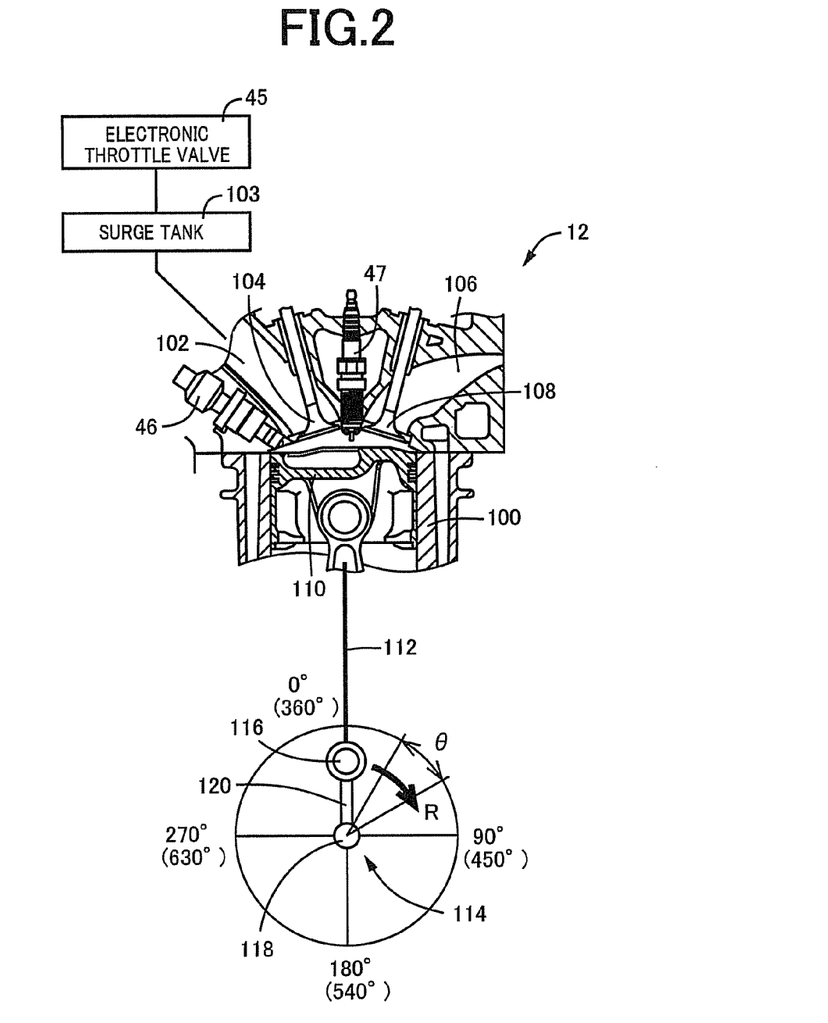
FIG. 2 is a cross-sectional view for explaining the direct injection engine of the hybrid vehicle in FIG. 1.

For the direct injection engine 12, an eight-cylinder four-cycle gasoline engine is used in this example and, as specifically depicted in FIG. 2, gasoline (high-pressure particulate) is directly injected by a fuel injection device 46 into a cylinder 100. The direct injection engine 12 allows air to flow from an intake passage 102 via an intake valve 104 into the cylinder 100 and allows exhaust gas to be discharged via an exhaust valve 108 from an exhaust passage 106 and, when ignition is caused by an ignition device 47 at a predetermined timing, air-fuel mixture in the cylinder 100 is exploded and combusted to push down a piston 110 to the lower side. The intake passage 102 is connected via a surge tank 103 to an electronic throttle valve 45 acting as an intake air amount adjustment device so as to control an amount of intake air flowing from the intake passage 102 into the cylinder 100, i.e., engine output, in accordance with an opening degree of the electronic throttle valve 45 (throttle valve opening degree). The piston 110 is axially slidably fitted into the cylinder 100 and is relatively rotatably coupled via a connecting rod 112 to a crank pin 116 of a crankshaft 114, and the crankshaft 114 is rotationally driven as indicated by an arrow R in accordance with linear reciprocating movement of the piston 110. The crankshaft 114 is rotatably supported by a bearing in a journal portion 118 and integrally includes a crank arm 120 connecting the journal portion 118 and the crank pin 116.

The direct injection engine 12 as described above performs four strokes, i.e., an intake stroke, a compression stroke, an expansion (explosion) stroke, and an exhaust stroke, per two rotations (720 degrees) of the crankshaft 114 and this is repeated to allow the crankshaft 114 to continuously rotate. The pistons 110 of the eight cylinders 100 are configured to have respective crank angles shifted by 90 degrees from each other and, each time the crankshaft 114 rotates by 90 degrees, the eight cylinders 100 are exploded and combusted in order, thereby continuously generating a rotation torque. When the crankshaft 114 rotates by a predetermined angle from a compression TDC at which the piston 110 of any of the cylinders 100 reaches a TDC (top dead center) after the compression stroke, and is stopped within a predetermined angle range $\theta$ in the expansion stroke with both the intake valve 104 and the exhaust valve 108 closed, gasoline can be injected by the fuel injection device 46 into the cylinder 100 and ignited by the ignition device 47 to perform an ignition start in which the air-fuel mixture in the cylinder 100 is exploded and combusted for a start. If friction of the portions of the direct injection engine 12 is small, the direct injection engine 12 can be started by the ignition start only and, even if the friction is large, the ignition start can reduce a start assist torque at the time of start with cranking of the crankshaft 114 and, therefore, a maximum torque of the motor generator MG generating the assist torque can be reduced to achieve smaller size and lower fuel consumption. When the angle range $\theta$ is within an appropriate range of, for example, about 30 to 60 degrees from the compression TDC, relatively large rotation energy can be acquired from the ignition start to reduce the assist torque. In the case of an eight-cylinder engine, the ignition start can be performed even within about 80 to 100 degrees from the compression TDC and the angle range $\theta$ differs depending on the number of cylinders of the direct injection engine 12.

Returning to FIG. 1, a K0 clutch 34 is disposed between, and directly couples, the direct injection engine 12 and the motor generator MG via a damper 38. The K0 clutch 34 is a single-plate or multi-plate hydraulic friction engagement clutch frictionally engaged by a hydraulic cylinder and is subjected to engagement/release control by a hydraulic control device 28 and disposed in an oil bath condition within an oil chamber 40 of the torque converter 14 in this example. The K0 clutch 34 is a hydraulic friction engagement device and acts as an engine connecting/disconnecting clutch connecting and disconnecting the direct injection engine 12 to/from a power transmission path. The motor generator MG is connected via an inverter 42 to a battery 44. The automatic transmission 20 is a stepped automatic transmission of planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc., disposed in the hydraulic control device 28. The C1 clutch 18 acts as an input clutch of the automatic transmission 20, is a frictional engagement type connecting/disconnecting device connecting and interrupting power transmission, and is also subjected to engagement/release control by the hydraulic control device 28.

The hybrid vehicle 10 as described above is controlled by an electronic control device 70. The electronic control device 70 includes a so-called microcomputer having a CPU, a ROM, a RAM, an I/O interface, etc., to execute signal processes in accordance with a program stored in advance in the ROM, while utilizing a temporary storage function of the RAM. The electronic control device 70 is supplied with a signal indicative of an operation amount (accelerator operation amount) Acc of an accelerator pedal from an accelerator operation amount sensor 48. The electronic control device 70 is also supplied with signals related to a rotation speed (engine rotation speed) NE of the direct injection engine 12, a rotation speed (MG rotation speed) NMG of the motor generator MG a rotation speed (turbine rotation speed) NT of the turbine shaft 16, a rotation speed (output shaft rotation speed corresponding to vehicle speed V) NOUT of the output shaft 22, a rotation angle (crank angle) $\phi$ from the TDC (top dead center) of each of the eight cylinders 100, an electric storage remaining amount SOC of the battery 44, and a road surface gradient hc, from an engine rotation speed sensor 50, an MG rotation speed sensor 52, a turbine rotation speed sensor 54, a vehicle speed sensor 56, a crank angle sensor 58, an SOC sensor 60, and a road surface gradient sensor 62, respectively. Various pieces of information necessary for various controls are also supplied. The SOC sensor 60 is configured to sequentially integrate a charge amount and a discharge amount of the battery 44 so as to obtain the electric storage remaining amount SOC, for example. The accelerator operation amount Acc corresponds to an output request amount by the driver.

The electronic control device 70 functionally includes a hybrid control means 72, a shift control means 74, an engine stop control means 76, and a creep control means 80. The hybrid control means 72 controls actuation of the direct injection engine 12 and the motor generator MG to switch a plurality of predefined running modes, such as an engine running mode using only the direct injection engine 12 as the drive power source for running, a motor running mode using only the motor generator MG as the drive power source for running, and an engine+motor running mode using both for running, depending on an operation state such as the accelerator operation amount Acc and the vehicle speed V for running, for example. The shift control means 74 controls the electromagnetic hydraulic control valves, switching valves, etc., disposed in the hydraulic control device 28 to switch the engaged/released state of the plurality of the hydraulic friction engagement devices, thereby switching a plurality of the gear stages of the automatic transmission 20 in accordance with a shift map defined in advance by using operation states such as the accelerator operation amount Acc and the vehicle speed V as parameters.

The engine stop control means 76 provides control for stopping the direct injection engine 12 at the time of switching from the engine+motor running mode to the motor running mode, at the time of inertia running during the engine+motor running mode or the engine running mode, at the time of deceleration, at the time of vehicle stop, etc., and adjusts a stop position of the crankshaft 114 such that the ignition start can be performed when the direct injection engine 12 is restarted. For example, when the K0 clutch 34 is interrupted to stop a rotation of the direct injection engine 12, the K0 clutch 34 is temporarily put into slip engagement immediately before the stop or immediately after the stop to rotate the crankshaft 114 so as to make an adjustment such that the crank angle φ of any of the cylinders 100 falls within an angle range θ in which the ignition start can be performed. As a result, the engine can be started by the ignition start at a subsequent engine start and the assist torque from the motor generator MG can be reduced to achieve smaller size and lower fuel consumption of the motor generator MG.

Figure 3:
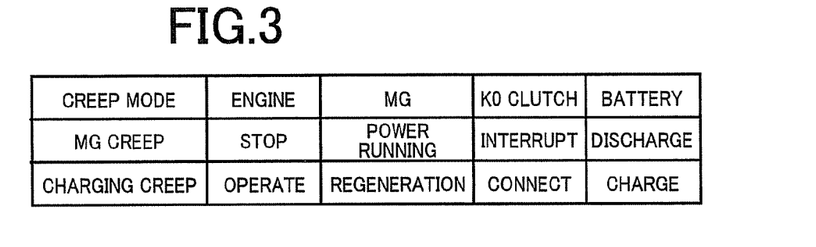
FIG. 3 is a diagram for explaining two types of the creep modes provided on the hybrid vehicle in FIG. 1.

The creep control means 80 generates a predetermined target creep torque during low speed running equal to or less than a predetermined vehicle speed or during vehicle stop and performs a MG creep mode generating the target creep torque by using the motor generator MG if the electric storage remaining amount SOC is greater than a predetermined lower limit value SOCmin. If the electric storage remaining amount SOC is equal to or less than the lower limit value SOCmin, the creep control means 80 performs a charging creep mode generating the target creep torque by operating the direct injection engine 12 while charging the battery 44 by the motor generator MG. As depicted in FIG. 3, In the MG creep mode, while the K0 clutch 34 is interrupted (released) and the direct injection engine 12 is stopped, the motor generator MG is subjected to power running control to be used as an electric motor and is rotationally driven at a predetermined rotation speed, thereby rotationally driving the oil pump 32 to generate a predetermined oil pressure and generating a predetermined target creep torque via the torque converter 14 and the C1 clutch 18. In the charging creep mode, the direct injection engine 12 is operated with the K0 clutch 34 connected, thereby rotationally driving the oil pump 32 to generate a predetermined oil pressure and generating a predetermined target creep torque via the torque converter 14 and the C1 clutch 18, while the motor generator MG is subjected to regenerative control (also referred to as electric generation control) and used as an electric generator to charge the battery 44 with generated electricity. In the charging creep mode, the C1 clutch 18 is engaged at an engagement torque corresponding to the target creep torque and a creep torque is limited to the target creep torque by a slip. The lower limit value SOCmin is provided with predetermined hysteresis to prevent busy shifts near a boundary.

The target creep torque may be defined as a constant torque enabling the vehicle to start on a flat road, for example, and to run at low speed equal to or less than about 10 km/hour, for example, or may be set by using the road surface gradient hc, a vehicle weight, etc., as parameters. For example, on a climbing road, the target creep torque may be set to generate a creep torque substantially balancing with, or smaller than, a slide-down torque of the vehicle, i.e., a creep torque at a level capable of preventing the vehicle from sliding down, or allowing the vehicle to slightly slide down, regardless of an upward slope. A common target creep torque is set in this example regardless of whether the MG creep mode or the charging creep mode.

Since the oil pump 32 is rotationally driven through a creep control, an oil pressure output from the oil pump 32 can retain the C1 clutch 18 in a connected state or a predetermined engagement state and can maintain the automatic transmission 20 at a predetermined gear stage even during vehicle stop so that a predetermined creep torque can be generated. The rotation speed (MG rotation speed) NMG of the motor generator MG during the MG creep mode and the rotation speed (engine rotation speed) NE of the direct injection engine 12 during the charging creep mode are set to, for example, a rotation speed equal to or greater than about 300 rpm so that the oil pump 32 can generate a predetermined oil pressure. The MG rotation speed NMG during the MG creep mode is further appropriately defined within, for example, a range of about 200 rpm to 600 rpm, and is set to about 300 rpm in this example, in consideration of efficiency characteristics of the motor generator, torque characteristics of the torque converter 14, a gear ratio of the power transmission path including the gear stage of the automatic transmission 20, etc., such that a predetermined creep torque can efficiently be generated. The engine rotation speed NE during the charging creep mode is also appropriately defined within, for example, a range of about 600 rpm to 1500 rpm, and is set to about 1000 rpm in this example, in consideration of efficiency characteristics of the direct injection engine 12, an electric generation efficiency of the motor generator MG, the torque characteristics of the torque converter 14, the gear ratio of the power transmission path including the gear stage of the automatic transmission 20, etc., such that a predetermined creep torque can efficiently be generated while an NV performance and a charge efficiency are not impaired. The engine rotation speed NE can be controlled by using an intake air amount adjustment device such as the electronic throttle valve 45 and an ISC (idle rotation speed control) valve not depicted, for example. The MG rotation speed NMG during the MG creep mode is the first rotation speed and the engine rotation speed NE during the charging creep mode is the second rotation speed.

Figure 4:
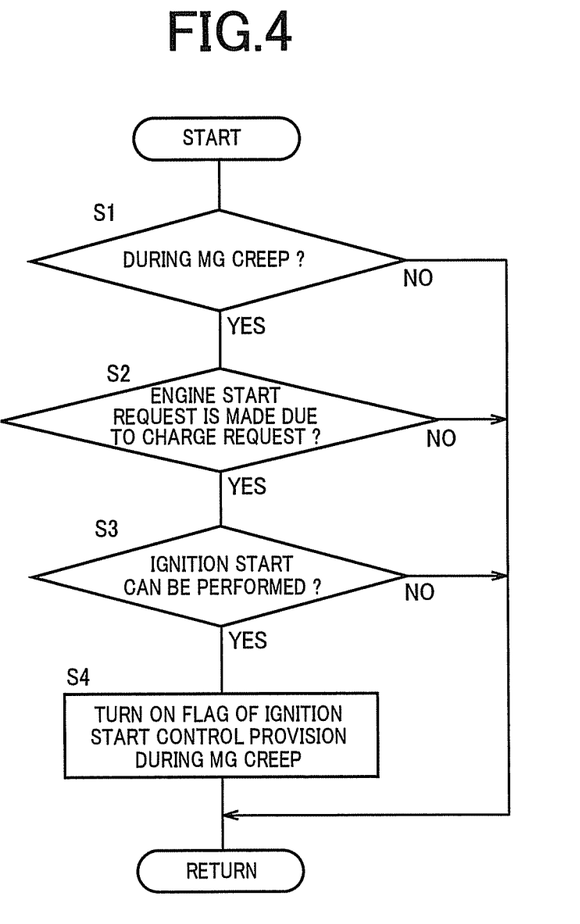
FIG. 4 is a diagram for explaining a function of the creep control included in the electronic control device of FIG. 1 and a flowchart for determining whether the direct injection engine executes an ignition start to make a transition to the charging creep mode during the MG creep control.
Figure 5:
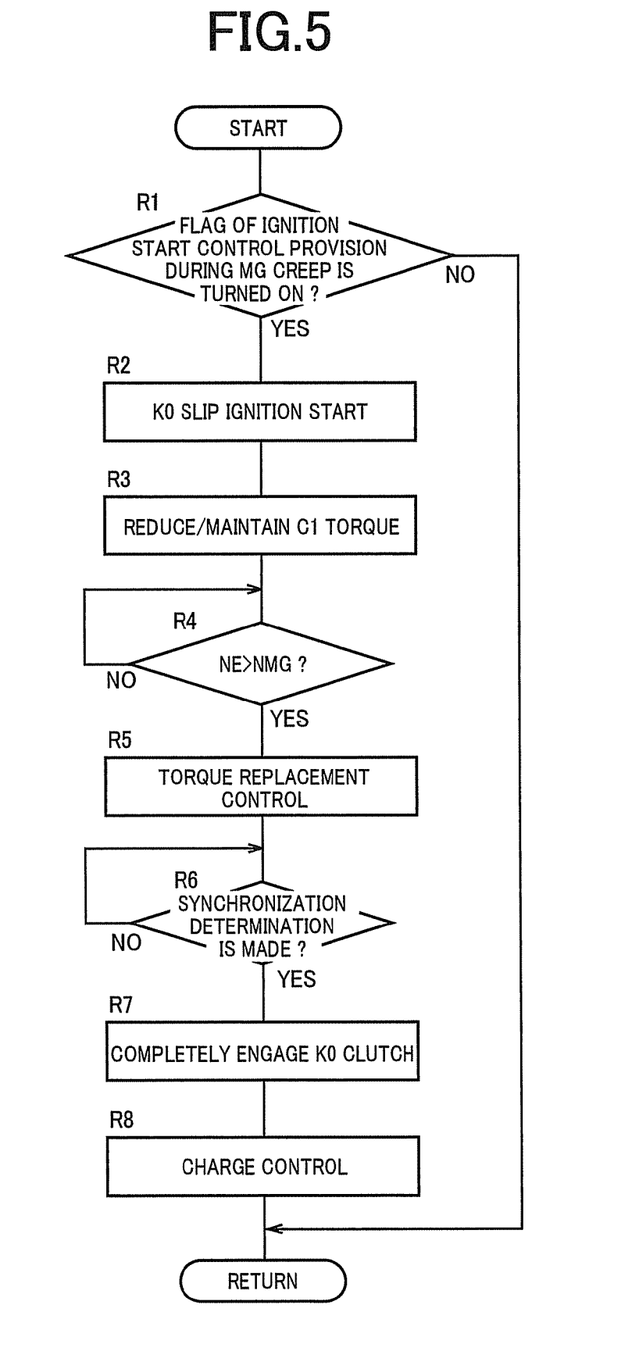
FIG. 5 is a flowchart for explaining an operation when the direct injection engine executes an ignition start to perform a switching from the MG creep mode to the charging creep mode if an ignition start control provision flag is turned on at step S4 of FIG. 4.

The creep control means 80 also includes an ignition start determining means 82, an engine ignition starting means 84, a C1 torque control means 86, and a torque replacing means 88 in relation to transition control when the electric storage remaining amount SOC of the battery 44 decreases to be equal to or less than the lower limit value SOCmin during the MG creep mode and the mode is switched to the charging creep mode. FIG. 4 is a flowchart for specifically explaining a signal process by the ignition start determining means 82 and FIG. 5 is a flowchart for specifically explaining a creep mode switching control by the engine ignition starting means 84, the C1 torque control means 86, and the torque replacing means 88. Steps R2 and R3 of FIG. 5 correspond to the engine ignition starting means 84 and the C1 torque control means 86, respectively, and steps R4 to R8 correspond to the torque replacing means 88.

At step S1 of FIG. 4, it is determined whether the MG creep mode is being performed and, if the MG creep mode is not being performed, the process is directly terminated and, if the MG creep mode is being performed, step S2 is executed. At step S2, it is determined whether an engine start request is made due to a charge request, based on whether the electric storage remaining amount SOC of the battery 44 decreases to be equal to or less than the lower limit value SOCmin, for example. In the case of SOC>SOCmin, the process is directly terminated and, if SOC<SOCmin is satisfied, step S3 is executed. At step S3, it is determined whether the ignition start can be performed. Specifically, for example, it is determined whether an engine water temperature is equal to or greater than a predetermined value and a crank angle φ of any of the cylinders 100 is within an angle range θ in which the ignition start can be performed. If it is determined that the ignition start can be performed, an ignition start control provision flag is turned on at step S4.

If it is determined that the ignition start cannot be performed, for example, while the rotation speed NMG of the motor generator MG is raised to a rotation speed at which the engine can be started (e.g., 600 rpm or higher), the K0 clutch 34 may be subjected to the engagement control for cranking etc. and starting the direct injection engine 12 to make a transition to the charging creep mode. In this case, for example, if an engagement torque of the C1 clutch 18 is reduced to cause a slip, a variation in the creep torque can be suppressed when the creep mode is switched.

Figure 6:
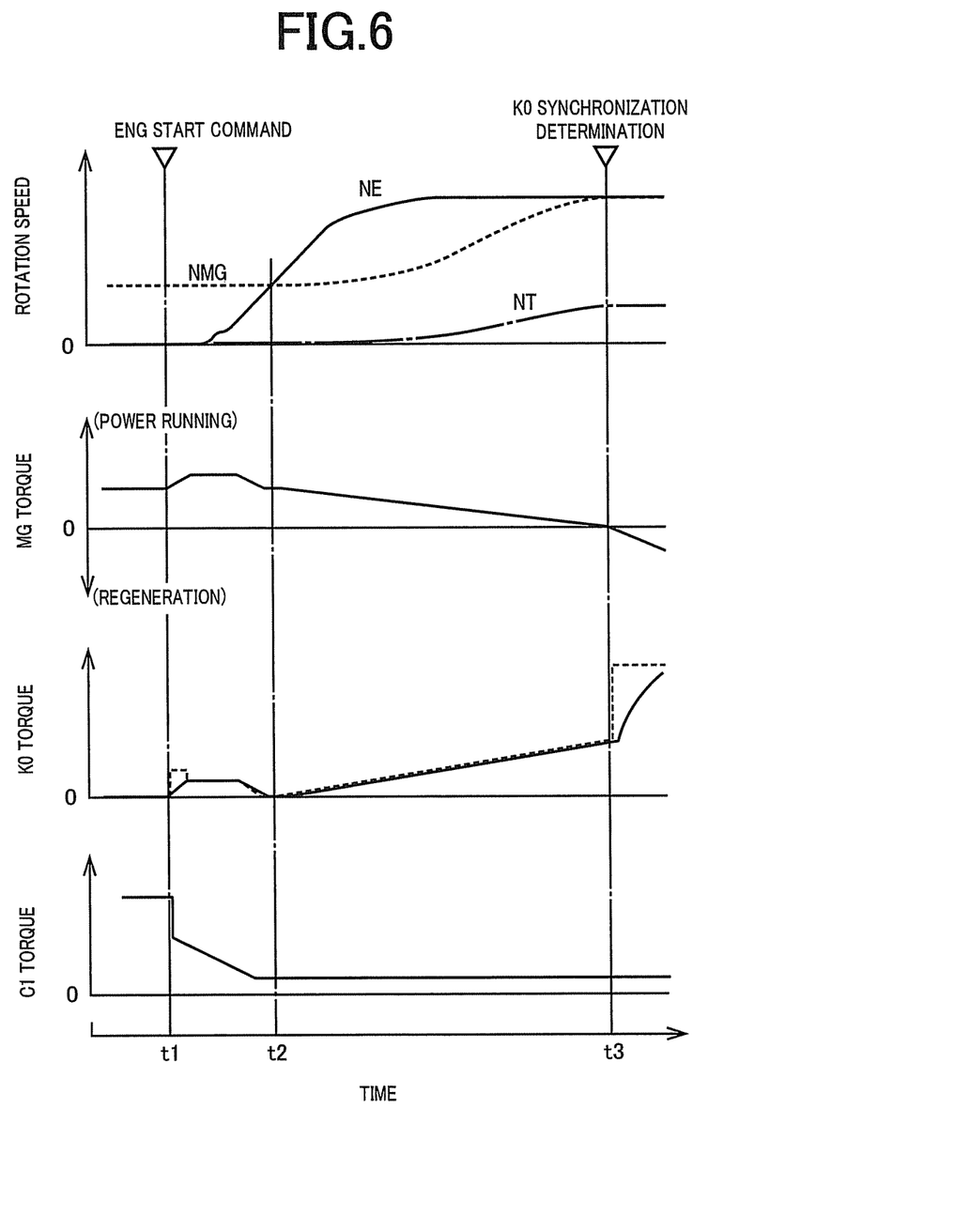
FIG. 6 depicts an example of time charts for explaining changes in operation states of the portions when a switching from the MG creep mode to the charging creep mode is performed in accordance with the flowchart of FIG. 5 and represents the case of stopping a vehicle on a flat road.
Figure 7:
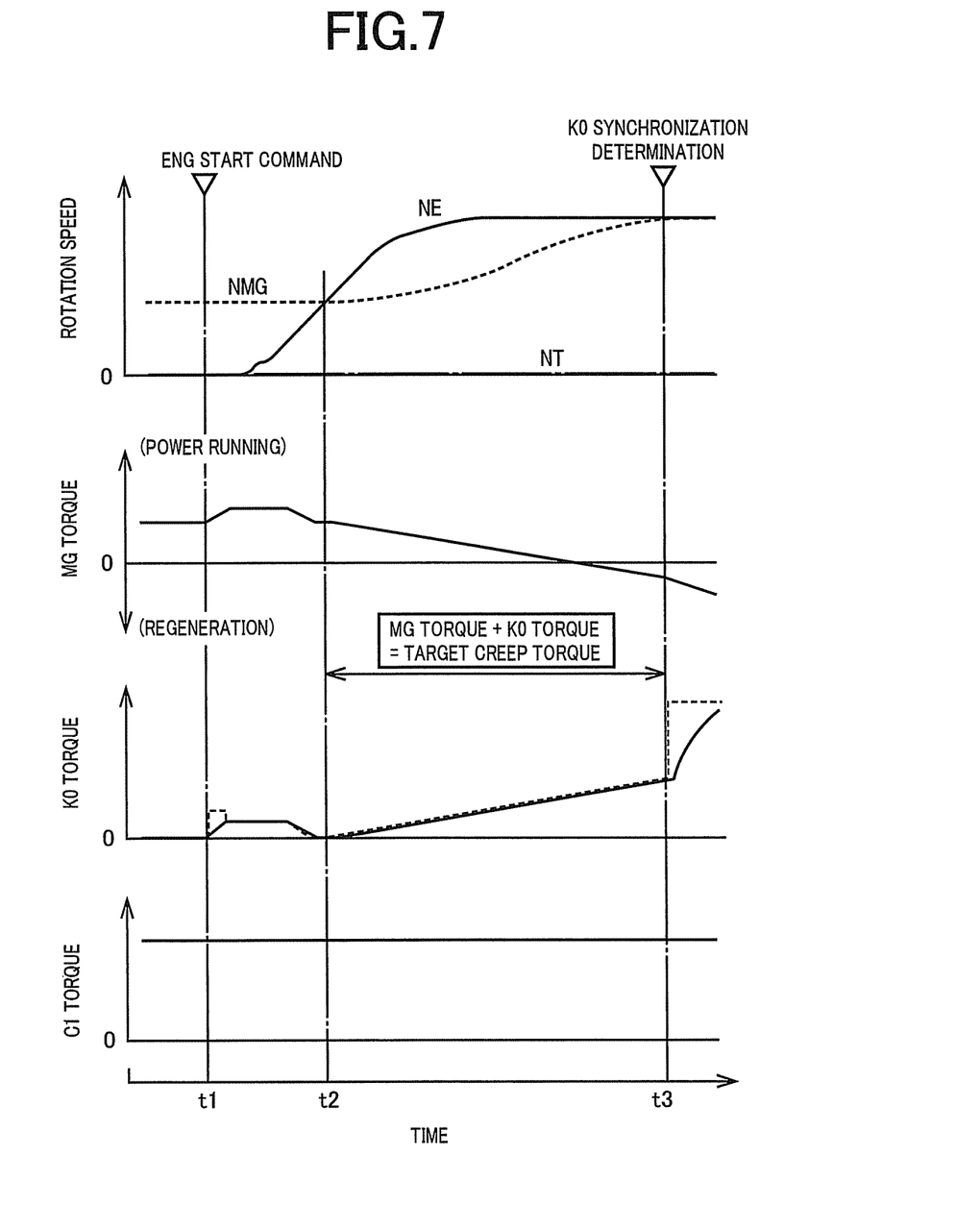
FIG. 7 depicts another example of time charts for explaining changes in operation states of the portions when a switching from the MG creep mode to the charging creep mode is performed in accordance with the flowchart of FIG. 5 and represents the case of stopping a vehicle on a climbing road.

At step R1 of FIG. 5, it is determined whether the ignition start control provision flag is turned on and, if the flag is turned on, the creep mode switching control from step R2 is provided. At step R2, the direct injection engine 12 is started by the ignition start and the ignition start is performed while the K0 clutch 34 is put into slip engagement to assist the rotation of the direct injection engine 12. FIGS. 6 and 7 depict examples of time charts for explaining changes in operation states of the portions when the creep mode switching control is provided in accordance with the flowchart of FIG. 5 and, in either time chart, at time t1 that is an ignition start initiation time, the ignition start is performed by injecting fuel into the cylinder 100 in the expansion stroke and igniting the fuel, and the K0 clutch 34 is put into the slip engagement at a predetermined engagement torque (K0 torque) to assist the rotation of the engine 12. A magnitude of the engagement torque is defined as the lowest torque within a range in which the direct injection engine 12 can certainly be started by the ignition start. A torque of the motor generator MG (MG torque) is increased by the same level as the engagement torque (assist torque) to prevent variation in the creep torque. When the engine rotation speed NE rises to a predetermined rotation speed such that self-sustaining rotation can certainly be performed, the K0 clutch 34 is released (K0 torque=0) and the MG torque is restored to the original. However, a slight oil pressure may be left in consideration of a delay in response at the time of subsequent connection control of the K0 clutch 34.

The time chart of FIG. 6 represents the case that the creep mode switching control is provided on a flat road and the time chart of FIG. 7 represents the case that the creep mode switching control is provided on a climbing road having the road surface gradient hc equal to or greater than a predetermined value with a risk of slide-down of the vehicle at the time of start etc. A broken line and a solid line in a "K0 torque" field in the time charts indicate a command value and an actual torque value, respectively, Returning to FIG. 5, at next step R3, the engagement torque (C1 torque) of the C1 clutch 18 is controlled depending on the road surface gradient hc. In particular, although the C1 clutch 18 is maintained in a completely engaged state as depicted in FIG. 7 on a climbing road having the road surface gradient hc equal to or greater than the predetermined value with a risk of slide-down of the vehicle at the time of start etc., the C1 torque is reduced to a torque corresponding to the target creep torque as depicted in FIG. 6 on a flat road etc. having the road surface gradient hc smaller than the predetermined value. If the C1 torque is reduced in this way, the creep torque is limited by a slip of the C1 clutch 18 and, therefore, the variation in the creep torque is suppressed regardless of changes in the MG torque and the engine torque during switching of the creep mode. On the other hand, if the C1 torque is reduced on the climbing road with a risk of slide-down of the vehicle, when the vehicle is started by stepping on an accelerator pedal instead of a brake pedal, the C1 clutch 18 may slip due to a delay in response of increase in an oil pressure (C1 torque) of the C1 clutch 18 and the vehicle may slide down; however, since the C1 clutch 18 is maintained in the completely engaged state in this example, a drive force is promptly increased in accordance with an output increase of the motor generator MG and the direct injection engine 12 and the slide-down of the vehicle is suppressed.

At step R4, it is determined whether the engine rotation speed NE exceeds the MG rotation speed NMG and if NE>NMG is satisfied, step R5 is executed. Since the MG rotation speed NMG is maintained at a setup rotation speed during the MG creep mode (about 300 rpm in this example) while the engine rotation speed NE is raised to a setup rotation speed during the charging creep mode (about 1000 rpm in this example), the engine rotation speed NE can exceed the MG rotation speed NMG. At step R5, the engagement torque (K0 torque) of the K0 clutch 34 is increased at a predefined constant change rate while the MG torque is reduced, thereby replacing the MG torque with the K0 torque (engine torque).

Time t2 of FIGS. 6 and 7 is a time when NE>NMG is satisfied and a torque replacement control of step 5 is started. In this case, since the creep torque is controlled by the C1 torque in the time chart of a flat road depicted in FIG. 6, a change rate of the MG torque can independently be defined separately from a change rate of the K0 torque and is defined such that the MG torque becomes substantially zero at substantially the same time as a timing when the MG rotation speed NMG is raised by an increase of the K0 torque and synchronized with the engine rotation speed NE, for example. The MG torque can be reduced in proportion to a speed difference (NE-NMG) between the engine rotation speed NE and the MG rotation speed NMG. In the time chart of FIG. 6, an input torque and an output torque of the torque converter 14 increase in the course of the torque replacement, and the C1 clutch 18 starts slipping to limit the creep torque while the turbine rotation speed NT increases.

On the other hand, in the time chart of a climbing road depicted in FIG. 7, the C1 clutch 18 remains completely engaged and, therefore, the MG torque is reduced at the change rate same as the change rate of the K0 torque so that the target creep torque is maintained. In other words, the MG torque is reduced while the K0 torque is increased so as to maintain the K0 torque+the MG torque=the target creep torque and, the MG torque is changed from a power running side to a regeneration side during replacement in the time chart of FIG. 7.

At next step R6, synchronization determination is made on whether the MG rotation speed NMG is substantially identical to the engine rotation speed NE and, if NMG≈NE is achieved, the K0 clutch 34 is subjected to the engagement control at step R7. Time t3 of FIGS. 6 and 7 is the time when the synchronization determination of NMG≈NE is made and the engagement control of the K0 clutch 34 of step R7 is started and, in this case, a command value of the K0 clutch 34 is immediately increased to the maximum value to promptly put the K0 clutch 34 into the complete engagement. At step R8, the torque of the motor generator MG is increased to a predetermined value at a relatively large change rate toward the regeneration side to charge the battery 44, and the electronic throttle valve 45 etc. are controlled for the direct injection engine 12 so as to maintain a predetermined engine rotation speed NE. In the creep mode switching control on a climbing road in which the ignition start of the direct infection engine 12 is performed while the C1 clutch 18 is left completely engaged, the creep torque is limited by engaging the clutch C1 at an engagement torque corresponding to the target creep torque after the engine start. As a result, the switching from the MG creep mode to the charging creep mode is completed.

In the hybrid vehicle 10 of this example, the rotation speed NE of the direct injection engine 12 during the charging creep mode is higher than the rotation speed NMG of the motor generator MG during the MG creep mode and, therefore, by operating the motor generator MG at a relatively low rotation (about 300 rpm in the example) during the MG creep mode, the predetermined target creep torque can efficiently be generated to improve fuel efficiency. During the charging creep mode, by operating the direct injection engine 12 at a relatively high rotation (about 1000 rpm in the example), the predetermined target creep torque can be generated and the battery 44 can be charged while suppressing deterioration of the NV performance and the charge efficiency as well as an engine stall.

On the other hand, when a transition is made from the MG creep mode to the charging creep mode, since the ignition start of the direct injection engine 12 is performed during the MG creep mode and the K0 clutch 34 is subjected to the connection control after the engine rotation speed NE of the direct injection engine 12 exceeds the rotation speed NMG of the motor generator MG to raise the rotation speed NMG of the motor generator MG and directly connect the direct injection engine 12 to the motor generator MG, deterioration of the electric storage remaining amount SOC and the degradation of the battery 44 are suppressed as compared to the cranking start and the creep mode can be switched while the variation in the creep torque is suppressed. In particular, although a surge tank pressure equivalent to an atmospheric pressure results in a larger torque at the beginning of the ignition start of the direct injection engine 12, the K0 clutch 34 is connected after exceeding the rotation speed NMG of the motor generator MG, and the creep torque is restrained from varying due to the larger torque at the beginning of the ignition start.

Since the creep torque is transmitted via the torque converter 14 and the C1 clutch 18 and the C1 torque thereof is reduced depending on the target creep torque before the K0 clutch 34 is subjected to the connection control when a transition is made from the MG creep mode to the charging creep mode on a flat road etc. having the road surface gradient hc equal to or less than the predetermined value, the creep torque is limited because the C1 clutch 18 is slipped depending on the C1 torque, and the variation in the creep torque is suppressed when the creep mode is switched. Particularly, because the creep torque is limited by a slip of the C1 clutch 18, a degree of freedom becomes higher in the torque replacement control of increasing the K0 torque and reducing the MG torque, and each of the change rates etc. can independently be defined or the replacement can be completed in a relatively short time.

When the K0 clutch 34 is subjected to the connection control for making a transition from the MG creep mode to the charging creep mode on a climbing road having the road surface gradient hc equal to or greater than the predetermined value, the torque replacement control is provided to increase the K0 torque and reduce the MG torque such that the predefined target creep torque is maintained while the C1 clutch 18 is maintained in the completely engaged state and, therefore, the variation in the creep torque is suppressed when the creep mode is switched. In this case, since the torque replacement control is provided while the C1 clutch 18 is maintained in the connected state, when the vehicle is started by stepping on the accelerator pedal instead of the brake pedal, the drive force is promptly increased in accordance with an output increase of the motor generator MG and the direct injection engine 12 and the slide-down of the vehicle is suppressed.

Although the example of the present invention has been described in detail with reference to the drawings, this is merely an embodiment and the present invention can be implemented in variously modified and improved forms based on the knowledge of those skilled in the art.

NOMENCLATURE OF ELEMENTS

10: hybrid vehicle 12: direct injection engine 14: torque converter (fluid transmission device) 18: C1 clutch (connecting/disconnecting device) 34: K0 clutch (engine connecting/disconnecting clutch) 44: battery 70: electronic control device 80: creep control means 88: torque replacing means MG: motor generator NE: engine rotation speed NMG: MG rotation speed

The invention claimed is:

1. A control device of a hybrid vehicle, the hybrid vehicle having a motor generator disposed in a power transmission path and performing as an electric motor and an electric generator, a direct injection engine configured to execute an ignition start in which fuel is injected into any cylinder with a piston stopped in an expansion stroke and ignited for the start, and an engine connecting/disconnecting clutch of friction engagement type directly connecting and interrupting the direct injection engine to/from the motor generator, the control device having an MG creep mode in which the motor generator is used as an electric motor and rotationally driven at a predetermined first rotation speed to generate a creep torque while the engine connecting/disconnecting clutch is interrupted and the direct injection engine is stopped, and a charging creep mode in which the direct injection engine is operated at a predetermined second rotation speed higher than the first rotation speed to generate the creep torque with the motor generator used as an electric generator to charge a battery while the engine connecting/disconnecting clutch is connected, the control device performing the ignition start of the direct injection engine during the MG creep mode and providing connection control of the engine connecting/disconnecting clutch after a rotation speed of the direct injection engine exceeds a rotation speed of the motor generator to raise the rotation speed of the motor generator and directly connect the direct injection engine to the motor generator when a transition is made from the MG creep mode to the charging creep mode.

2. The control device of a hybrid vehicle of claim 1, wherein a fluid transmission device is disposed between the motor generator and drive wheels and a connecting/disconnecting device of frictional engagement type is disposed between the fluid transmission device and the drive wheels to transmit a creep torque via the fluid transmission device and the connecting/disconnecting device, and wherein an engagement torque of the connecting/disconnecting device is reduced depending on a predefined target creep torque before the engine connecting/disconnecting clutch is subjected to the connection control when the transition is made from the MG creep mode to the charging creep mode.

3. The control device of a hybrid vehicle of claim 1, wherein when the engine connecting/disconnecting clutch is subjected to the connection control for making the transition from the MG creep mode to the charging creep mode, an engagement torque of the engine connecting/disconnecting clutch is increased while a torque of the motor generator is reduced so as to maintain the predefined target creep torque.

* * * * *